United States Patent
Yik et al.

(10) Patent No.: US 7,082,138 B2
(45) Date of Patent: Jul. 25, 2006

(54) INTERNAL COMMUNICATION PROTOCOL FOR DATA SWITCHING EQUIPMENT

(75) Inventors: James Ching-Shau Yik, Mission Viejo, CA (US); Linghsiao Wang, Tustin, CA (US)

(73) Assignee: Zarlink Semiconductor V.N. Inc., Irvine, CA (US)

(*) Notice: Subject to any disclaimer, the term of this patent is extended or adjusted under 35 U.S.C. 154(b) by 1030 days.

(21) Appl. No.: 09/966,691

(22) Filed: Sep. 28, 2001

(65) Prior Publication Data

US 2002/0093964 A1 Jul. 18, 2002

Related U.S. Application Data (60) Provisional application No. 60/236,165, filed on Sep. 29, 2000.

(51) Int. Cl.
- *A04L 12/56* (2006.01)
- *G06F 3/00* (2006.01)
- *G06F 13/00* (2006.01)

(52) U.S. Cl. ......................... 370/410; 710/21; 710/100

(58) Field of Classification Search ................ 370/535, 370/538–539, 410, 389, 392, 395.1; 710/100, 710/20–21

See application file for complete search history.

(56) References Cited

U.S. PATENT DOCUMENTS

| 4,864,558 | A | * | 9/1989 | Imagawa et al. ........... 370/422 |
| 5,742,604 | A | | 4/1998 | Edsall et al. |
| 6,904,062 | B1 | * | 6/2005 | Tng et al. .................... 370/537 |
| 2004/0196857 | A1 | * | 10/2004 | Holloway et al. .......... 370/401 |

FOREIGN PATENT DOCUMENTS

| JP | 11041246 A | 2/1999 |
| KR | 153944 | 7/1997 |

* cited by examiner

*Primary Examiner*—Chi Pham
*Assistant Examiner*—Ronald Abelson
(74) *Attorney, Agent, or Firm*—Lawrence E. Laubscher, Jr.

(57) ABSTRACT

A protocol enabling the exchange of information between data switching node components and a supervisory management processor is provided. The protocol defines a data frame format, data fields, data field values of a group of command frames. The exchange of information therebetween via the defined frames enables the production of data switching equipment having a generic implementation with a deployable, upgradeable and expandable feature set providing and enhancing support for current and future services.

30 Claims, 10 Drawing Sheets

MAC ADDR Learn Request Frame sent from Management Processor

|        | FRAME # | SIZE  | ADDR 2 | ADDR 1 | ADDR 0 | CMD 1 | XXXX0100 |
|--------|---------|-------|--------|--------|--------|-------|----------|
| PORT # | STAT    | MAC 5 | MAC 4  | MAC 3  | MAC 2  | MAC 1 | MAC 0    |
|        |         |       | . . .  |        |        |       |          |
|        |         |       |        |        |        |       |          |

MAC ADDR Delete Request Frame sent from Management Processor

|  | FRAME # | SIZE  | ADDR 2 | ADDR 1 | ADDR 0 | CMD 1 | XXXX0000 |
|--|---------|-------|--------|--------|--------|-------|----------|
|  |         | MAC 5 | MAC 4  | MAC 3  | MAC 2  | MAC 1 | MAC 0    |
|  |         |       | . . .  |        |        |       |          |
|  |         |       |        |        |        |       |          |

MAC ADDR Search Request Frame sent from Management Processor

|  | FRAME # | SIZE  | ADDR 2 | ADDR 1 | ADDR 0 | CMD 1 | XXXX0011 |
|--|---------|-------|--------|--------|--------|-------|----------|
|  |         | MAC 5 | MAC 4  | MAC 3  | MAC 2  | MAC 1 | MAC 0    |
|  |         |       | . . .  |        |        |       |          |
|  |         |       |        |        |        |       |          |

Learn Multicast ADDR Request Frame sent from Management Processor

|          | FRAME # | SIZE    | ADDR 2  | ADDR 1    | ADDR 0    | CMD 1     | XXXX1100  |
|----------|---------|---------|---------|-----------|-----------|-----------|-----------|
| VLAN IDX |         | VLAN ID | VLAN ID | IP ADDR 3 | IP ADDR 2 | IP ADDR 1 | IP ADDR 0 |
|          |         |         | . . .   |           |           |           |           |
|          |         |         |         |           |           |           |           |

Delete Multicast ADDR Request Frame sent from Management Processor

|  | FRAME # | SIZE    | ADDR 2  | ADDR 1    | ADDR 0    | CMD 1     | XXXX1000  |
|--|---------|---------|---------|-----------|-----------|-----------|-----------|
|  |         | VLAN ID | VLAN ID | IP ADDR 3 | IP ADDR 2 | IP ADDR 1 | IP ADDR 0 |
|  |         |         | . . .   |           |           |           |           |
|  |         |         |         |           |           |           |           |

510: Search Multicast ADDR Request Frame snet from Management Processor

|  | FRAME # | SIZE    | ADDR 2  | ADDR 1    | ADDR 0    | CMD 1     | XXXX1011  |
|--|---------|---------|---------|-----------|-----------|-----------|-----------|
|  |         | VLAN ID | VLAN ID | IP ADDR 3 | IP ADDR 2 | IP ADDR 1 | IP ADDR 0 |
|  |         |         | . . .   |           |           |           |           |
|  |         |         |         |           |           |           |           |

FIG. 8

Response Frame to MAC ADDR Search sent to Management Processor

| RESULT | FRAME # | SIZE | ADDR 2 | ADDR 1 | ADDR 0 | CMD 1 | XXXX1111 |
|---|---|---|---|---|---|---|---|
| | | MAC 5 | MAC 4 | MAC 3 | MAC 2 | MAC 1 | MAC 0 |
| | | | | | | | |
| | | | | | | | |

Response Frame to Multicast ADDR Search sent to Management Processor

| RESULT | FRAME # | SIZE | ADDR 2 | ADDR 1 | ADDR 0 | CMD 1 | XXXX1110 |
|---|---|---|---|---|---|---|---|
| | | VLAN ID | VLAN ID | IP ADDR 3 | IP ADDR 2 | IP ADDR 1 | IP ADDR 0 |
| | | | | | | | |
| | | | | | | | |

Interrupt Request Frame on Counter Roll-Over sent to Management Processor

| PORT # | SIZE | ADDR 2 | ADDR 1 | ADDR 0 | CMD 1 | XXXX0111 |
|---|---|---|---|---|---|---|
| | | INT 3 | INT 2 | INT 1 | INT 0 |
| | | | | | | |

Delete Multicast ADDR Request Frame sent to Management Processor

| FRAME # | SIZE | ADDR 2 | ADDR 1 | ADDR 0 | CMD 1 | XXXX1101 |
|---|---|---|---|---|---|---|
| | VLAN ID | VLAN ID | IP ADDR 3 | IP ADDR 2 | IP ADDR 1 | IP ADDR 0 |
| | | ... | | | | |
| | | | | | | |

Delete MAC ADDR Request Frame sent to Management Processor

| PORT # | SIZE | ADDR 2 | ADDR 1 | ADDR 0 | CMD 1 | XXXX0000 |
|---|---|---|---|---|---|---|
| | MAC 5 | MAC 4 | MAC 3 | MAC 2 | MAC 1 | MAC 0 |
| | | ... | | | | |
| | | | | | | |

Learn MAC ADDR Request Frame sent to Management Processor

| PORT # | SIZE | ADDR 2 | ADDR 1 | ADDR 0 | CMD 1 | XXXX0100 |
|---|---|---|---|---|---|---|
| STAT | MAC 5 | MAC 4 | MAC 3 | MAC 2 | MAC 1 | MAC 0 |
| | | ... | | | | |
| | | | | | | |

New VLAN Port Request Frame sent to Management Processor

| VLAN IDX | PORT # | SIZE | ADDR 2 | ADDR 1 | ADDR 0 | CMD 1 | XXXX1010 |
|---|---|---|---|---|---|---|---|
| | | | ... | | | | |
| | | | | | | | |

Age VLAN Port Request Frame to Management Processor

| VLAN IDX | PORT # | SIZE | ADDR 2 | ADDR 1 | ADDR 0 | CMD 1 | XXXX1001 |
|---|---|---|---|---|---|---|---|
| | | | AGED VLAN PORT | | | | |
| | | | ... | | | | |
| | | | | | | | |

INTERNAL COMMUNICATION PROTOCOL FOR DATA SWITCHING EQUIPMENT

This application claims the benefit of U.S. Provisional Patent Application No. 60/236,165 filed Sep. 29, 2000.

FIELD OF THE INVENTION

The invention relates to data switching, and in particular to methods of exchanging information internal to data switching equipment in operating thereof and provisioning data services.

BACKGROUND OF THE INVENTION

In the field of data switching, the performance of data switching nodes participating in data transport networks is of outmost importance. The range of features supported and the array of deployable services is of an equally high importance.

Figure 1:
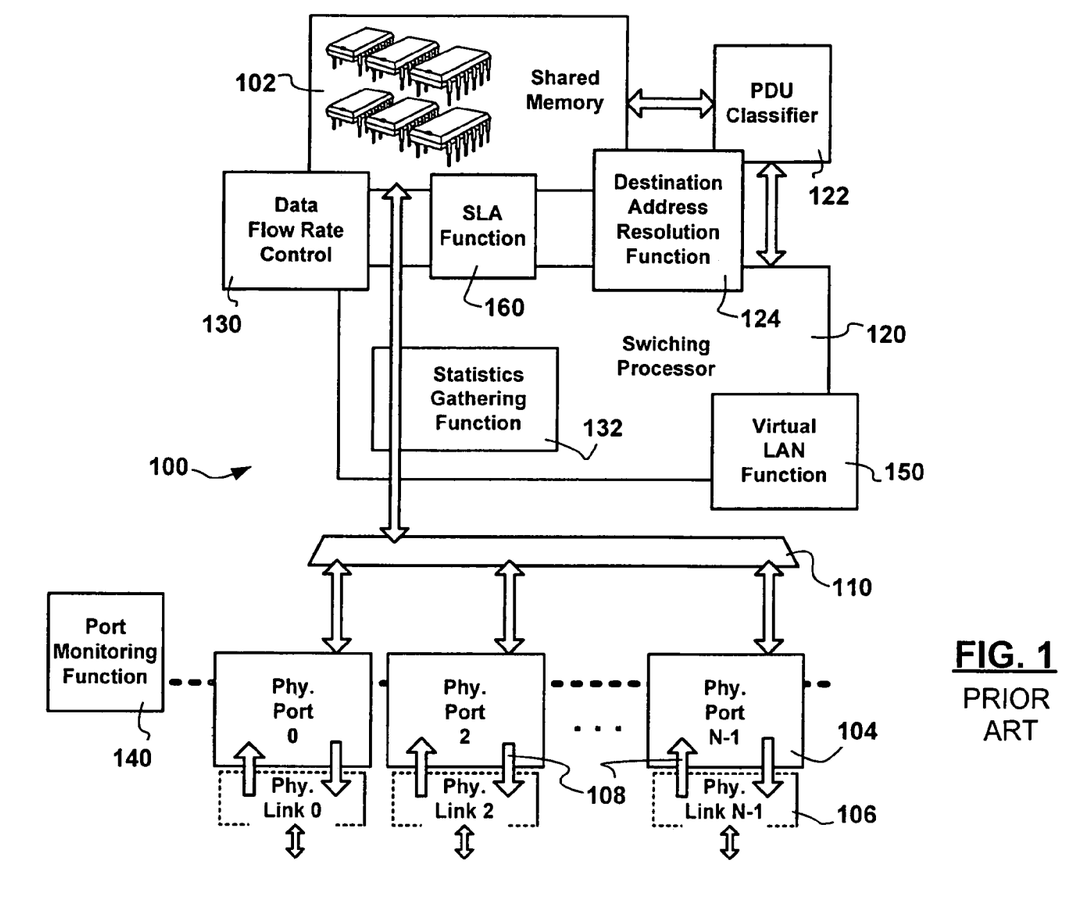
FIG. 1 is a schematic diagram showing a general functional architecture of a data switching node.

FIG. 1 is a schematic diagram showing general functional components of a data switching node 100. The data switching node 100 is a multi-ported device having a shared memory 102 design and forwarding Protocol Data Units (PDUs) between N physical ports 104 in accordance with supported data transfer protocols. Although pictured as such, the invention is not limited to data switching equipment having a shared memory design.

PDUs include and are not limited to: cells, frames, packets, etc. Each PDU has a size. Cells have a fixed size while frames and packets may vary in size. Each PDU has associated header information used in forwarding the PDU towards a destination data network node in the associated data transport network. The header information is consulted at data switching nodes in determining the output port via which to forward the PDU towards the destination data network node. More than one output port may be determined to forward a PDU to as is the case for PDUs multicasted to a group of data network nodes.

Each physical port 104 is adapted to receive and transmit data via an associated physical link 106 as shown at 108. Each physical port 104 has an associated physical data transfer rate. Physical port 104 designs having an adjustable physical data transfer rate exist. Physical ports 104 can also be used to convey data adhering to more than one data transfer protocol. A design requirement is that the data switching node 100 be able to process and convey PDUs such that all physical ports 104 receive and transmit simultaneously at their full physical data transfer rates. The operation of each physical port 104 is controlled via associated physical port operational parameters.

The overall operation of a data switching node 100 includes: receiving at least one PDU via an input port 104, determining an appropriate output port 104 to forward the PDU to, scheduling the PDU for transmission, and transmitting the PDU via the determined output port 104. In determining the appropriate output port, PDUs may be stored in processing queues in the shared memory 102. Each physical port 104 has access to the shared memory 102 via a data bus 110. Processing queues are used to: match data transfer rates, match data transfer rates with processing rates, enable data flow rate estimation and enforcement, evaluate processing rates, enable statistics gathering, etc.

Although in principle, the operation of data switching node 100 is simple, the implementation of such data switching equipment is not trivial. Efficient operation of the data switching node 100 is dependent on an efficient management of resources and efficient deployment of services.

The header information is also consulted in: managing the operation of the data switching node 100, managing resources of the data switching node 100 and to some extent data network resources associated therewith, provisioning data services, etc.

Managing the operation of the data switching node 100 and managing resources at the data switching node 100 is essential for efficient data switching performed by a switching processor 120. In forwarding PDUs, the switching processor 120 makes use of a PDU classifier 122 to inspect PDUs pending processing and to inspect a body of routing information provided by an associated destination address resolution function 124 to determine output ports 104. The PDU classifier 122 also makes a determination whether PDUs are unicast or a multicast.

In processing PDUs, the body of routing information may be modified. Modifying the body of routing information is necessary in establishing new data transport routes in the data transport network for data sessions and the associated data transfers. As the header information is processed, the data switching node 100 learns of new data network nodes. In determining output ports 104 to forward PDUs to, the data switching node 100 learns of new routes to destination data network nodes.

The body of routing information can be stored in the shared memory 102. The sharing of data storage resources for PDU buffering and for storing routing information, consolidates the memory storage requirements at the data switching node 100 and simplifies the design of the data switching node 100 leading to reduced implementation costs.

An exemplary resource management function relates to data flow rate enforcement 130. Another resource management function and to some extent an operational management function of the data switching node 100 is provided via data flow statistics gathering 132. Link layer operation is managed through a port monitoring function 140.

An example of a service includes virtual networking supported at the data switching node 100 via a virtual networking function 150. By deploying new services, the data switching node learns of new Virtual Local Area Network (VLANs) being established, etc. PDU header information is consulted to determine PDU treatment characteristics such as VLAN associativity in support of the virtual networking function 150, Class-of-Service (CoS) associativity in providing Quality-of-Service (QoS) guarantees in support of a Service Level Agreement (SLA) enforcement function 160, PDU forwarding priorities in support of data streaming functionality, etc.

The learning ability of the data switching node is largely controlled by learning protocols which collectively provide data transport network topology discovery features. The learning ability is also limited by processing resources available at the data switching node such as processing power, memory storage resources, processing bandwidth, etc.

Manufacturers of data switching equipment have been under a high market pressure to reduce component count which led to embedded designs. Learning protocols used by the data switching nodes are typically embedded and form an integral part of the firmware/software executed during the operation of the data switching node.

Figure 2:
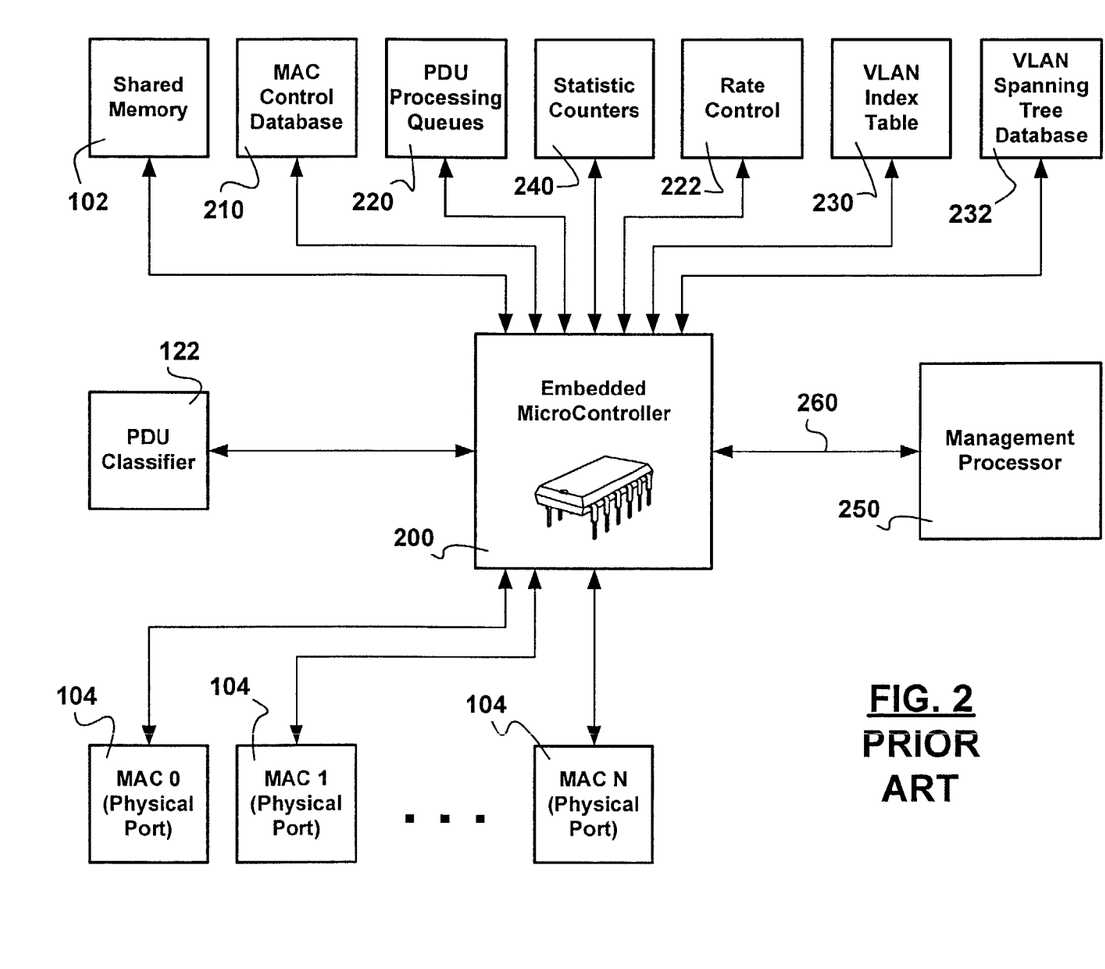
FIG. 2 is a schematic diagram showing an exemplary prior art implementation of a data switching node providing affecting resource management and delivering data services.

FIG. 2 is a schematic diagram showing an exemplary implementation of a data switching node affecting resource management and delivering data services.

Typical embedded designs of data switching equipment make use of a microcontroller 200 to enable an unmanaged operation thereof. The microcontroller 200 is factory programmed to support a specific feature set enabling the data switching node to function autonomously.

The microcontroller 200 interfaces with the shared memory 102 to access PDU data and other data used in processing PDUs such as but not limited to the above mentioned body of routing information.

In implementing the destination address resolution function 124, the microcontroller 200 interfaces with a Media Access Control (MAC) control database 210 storing tables specifying destination data nodes identifiers reachable via each physical port 104. The port monitoring function 140 may also use the same the MAC control database 210 to store operational parameters of each physical port 104 including data transfer rates, data transfer protocols supported, parameters associated with data network topology discovery, link status, etc. In support of the port monitoring function 140 the microcontroller 200 interfaces with each physical port 104 to obtain information, monitor and change operational parameters thereof.

In implementing the data flow rate control function 130, the microcontroller interfaces with a PDU processing queue control block 220 and a rate control block 222. The PDU processing queue control block 220 tracks the usage of memory buffer space in the shared memory 102 via registers holding queue size values, queue locations in the shared memory 102, etc. The rate control block 222 stores registers specifying: queue low watermark occupancy levels, queue high watermark occupancy levels, current queue occupancy status for each processing queue, current data throughput rate for each processing queue, current data throughput status for each processing queue, data flow variables, whether flow control is enabled, etc.

In implementing the virtual networking function 150, the microcontroller 200 interfaces with a VLAN index table 230 and a VLAN spanning tree database 232. The VLAN index table 230 stores associations between data network node identifiers and virtual network identifiers, data transmission priorities for virtual network associated data, data transmission parameters including bandwidths, etc. The VLAN spanning tree database 232 stores a hierarchical association between virtual networks and related parameters.

In implementing the statistics gathering function 132, the microcontroller interfaces with a statistics counter block of registers 240 holding values for statistics counters. Examples of statistics counters include but are not limited to number of PDUs received, number of PDUs transmitted, number of bit errors instances, etc. There are global statistics counters, port statistics counters, service specific statistics counters, etc.

The presented design can be reduced to a single silicon chip. Such embedded designs although providing for a very compact data switching node tend to be proprietary, not easily upgradeable, non-scaleable, etc. The supported feature set tends to be limited by what was typically required of data switching equipment at the time of development.

For managed mode operation a management processor 250 may be used mainly for status reporting and higher level functions. The operational status of the data switching node is brought to the application layer and out to monitoring software applications such as network management applications perhaps, remote from the data switching node 100. A proprietary data connection 260 is provided between the microprocessor 200 and the management processor 250.

In operation the microcontroller 200 and management processor 250 are used together to manage resources and deliver services. Functions of the embedded microcontroller 200 include: initialize internal and external memory registers, the coordination of information synchronization between the above mentioned components including the management processor 250, send commands to components for execution, receive reports from components, alert the management processor 250 component of operation critical events detected by other components, etc.

Current designs have been implemented using a large number of memory access registers to reference different memory locations in enabling information exchange. In enabling the reporting of critical events, as many as 20 interrupt sources per physical port 104 have been used but, by provisioning access thereto via the above mentioned registers, the management processor 250 needs to reference multiple hierarchical registers to determine the interrupt source and service it.

The microcontroller 200 is programmed with specific information exchange protocols for each component to enable the implementation of each function. The development of additional functionality and the addition of new features in support of enhanced and new services, necessitates the re-coding of the microcontroller 200. Any upgrade of any of the components including the management processor 250 also requires the re-coding of the microprocessor 200.

Therefore there is a need to provide enhanced methods of monitoring the performance of data switching nodes as well as providing support for service delivery in enhancing the performance of the data switching node 100.

SUMMARY OF THE INVENTION

In accordance with an aspect of the invention, a method of exchanging information internal to a data switching node is provided. The method includes a sequence of steps. The information to be exchanged is encapsulated in a data frame at a first component internal to the data switching node. The data frame is conveyed between the first component and a second component via a data exchange medium. The data is decapsulated by the second component.

In accordance with another aspect of the invention, the exchanged information includes a data stream.

In accordance with a further aspect of the invention, the exchanged information includes a request.

In accordance with yet another aspect of the invention, the exchanged information includes an interrupt request.

The conveyance of encapsulated information between internal components of data switching equipment enables easy expansion, upgrade and new deployment of features and services in data switching environments. In particular, it enables independent development of components, functions, features and services. The advantages are derived from a generic hardware implementation with a deployable, upgradeable and expandable feature set providing and enhancing support for current and future services.

BRIEF DESCRIPTION OF THE DRAWINGS

The features and advantages of the invention will become more apparent from the following detailed description of the preferred embodiment(s) with reference to the attached diagrams wherein.

It will be noted that in the attached diagrams like features bear similar labels.

DETAILED DESCRIPTION OF THE EMBODIMENTS

In accordance with a preferred embodiment of the invention the development of the application code and the development of the hardware components of a data switching node are separated. The separation is enabled via a unified information exchange protocol shielding a management processor from hardware implementation details.

The unified information exchange protocol includes a group of data frame encapsulated interrupt requests, requests and responses to enable management of data switching node resources and service delivery.

Figure 3:
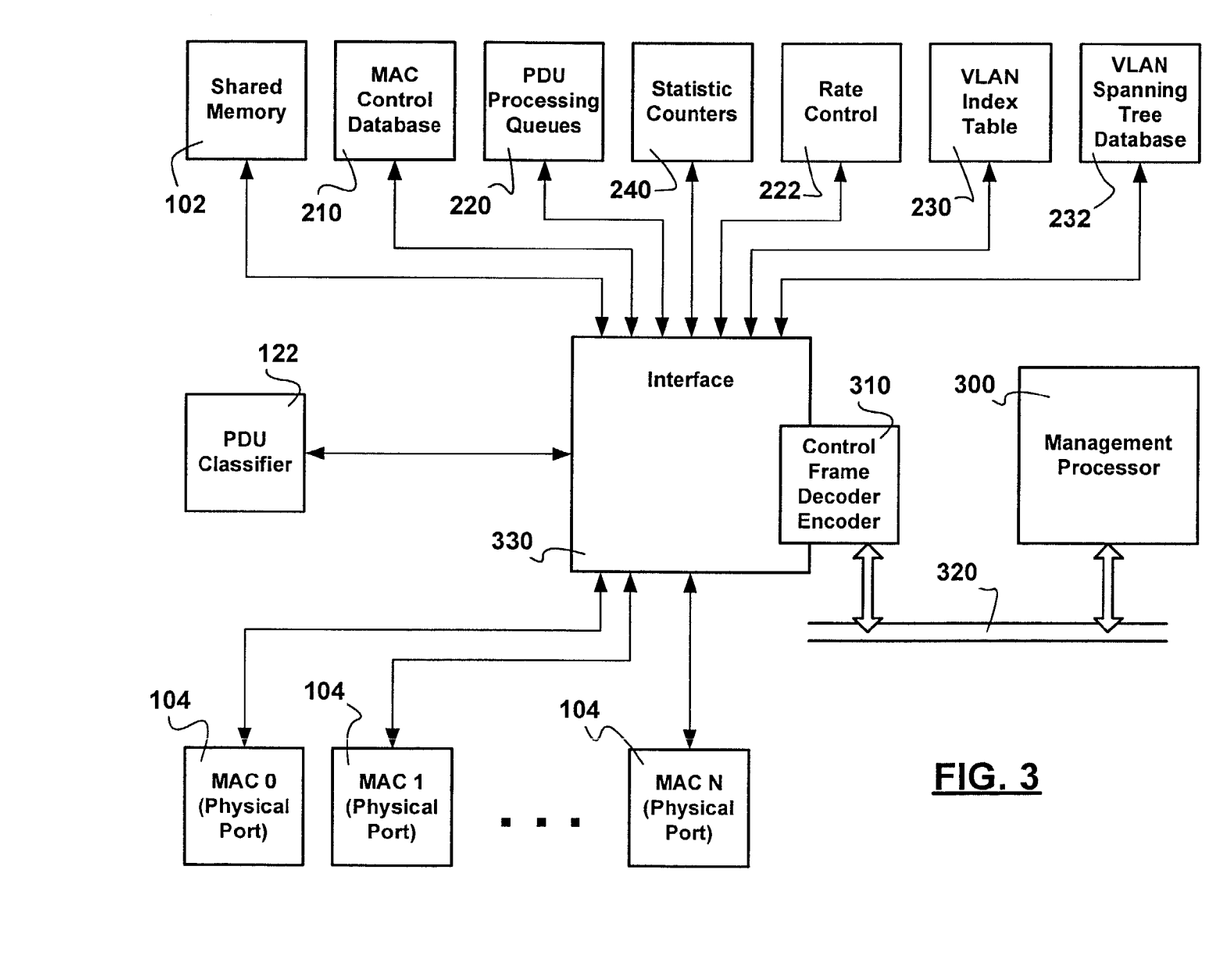
FIG. 3 is a schematic diagram showing an exemplary implementation of a data switching node providing resource management and delivering data services in accordance with an exemplary implementation of the invention.

FIG. 3 is a schematic diagram showing an exemplary implementation of a data switching node providing resource management and delivering data services in accordance with an exemplary implementation of the invention.

The unified information exchange protocol makes use of data frames exchanged between the management processor 300 and a frame translator 310 via a data exchange medium 320. The data exchange medium 320 may include, but is not limited to: a data bus having data bus width of: 8 bits, 16 bits, 32 bits, etc.; as well as a serial link. For the purpose of exchanging information via the data exchange medium 320, the data frames exchanged are divided in to data fragments having a length corresponding to the width of the data exchange medium 320.

The frame translator 310 is associated with an interface 330 which communicates directly with the different components implementing the features and associated functions of the data switching node. The interface 330, the translator 310 and the unified information exchange protocol, mask low level information exchange implementation details of service/feature delivery components from service/feature enabling components such as the management processor 300.

Although only one service enabling component such as the management processor 300 is shown, the invention, through the unified information exchange protocol, can be extended to multiple service enabling components, each of which is optimized in provisioning specific services.

Figure 4:
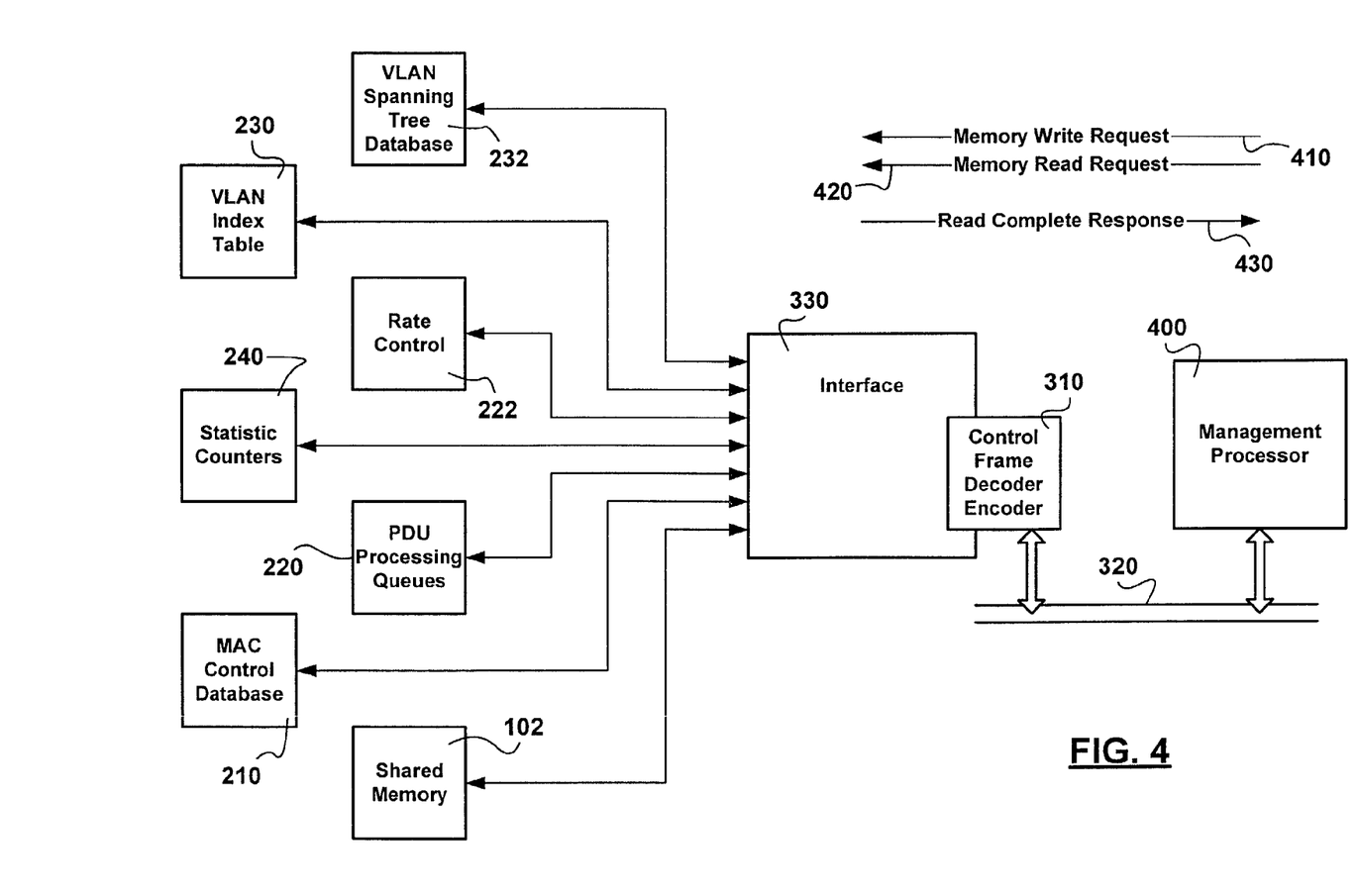
FIG. 4 is a schematic diagram showing exemplary internal components of a data switching node and, associated requests and responses implementing an information exchange protocol in accordance with an exemplary implementation of the invention.

FIG. 4, is a schematic diagram showing exemplary internal components of a data switching node and, associated requests and responses implementing an information exchange protocol in accordance with an exemplary implementation of the invention.

The management processor 400 is adapted to exchange information such as a stream of data with service delivery components of the data switching node. Data stream information exchanges may be used in initializing service delivery components on startup and/or in synchronizing information stored therein with the management processor 400.

In accordance with a preferred implementation of the invention, conveyed data streams are divided into data granules of up to 32 bytes. The invention is not limited to 32 byte long data granules, the granule size being a design choice. Each data granule is encapsulated as a payload of a data frame. An 8 byte header is included in the data frame prior to the conveyance thereof.

The header specifies the associativity of the conveyed data granule with one of a group of data frame types. The group of data frame types includes a request for a memory write 410 from the management processor 400, a request for a memory read 420 from the management processor 400, and a read complete response 430 sent to the management processor 400. The payload of the read complete response 430 may also correspond to a data granule of a data stream to be conveyed to the management processor 400.

Figure 7:
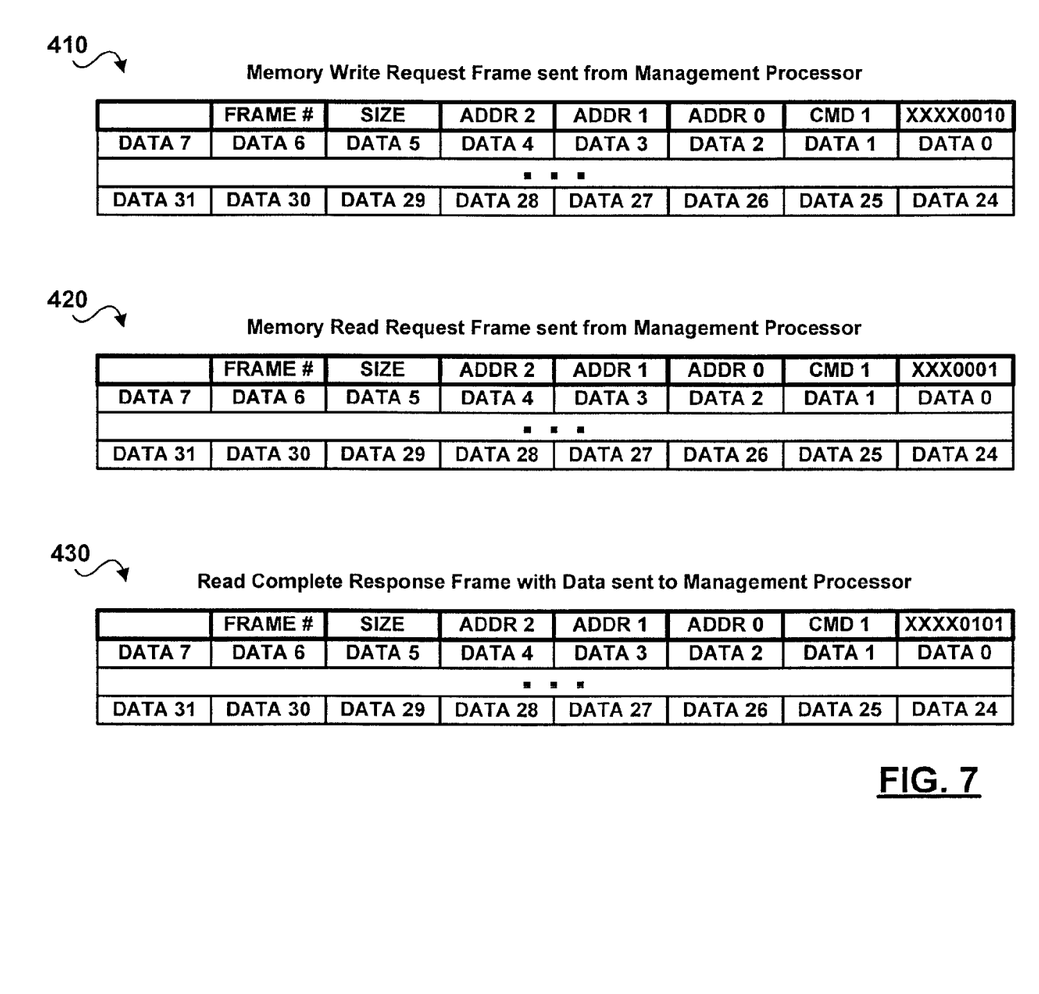
FIG. 7, FIG. 8, FIG. 9, FIG. 10 and FIG. 11 are a schematic diagrams showing data frame formats for data frames exchanged with the management processor in implementing an information exchange protocol in accordance with an exemplary implementation of the invention.

The data frame formats corresponding to requests 410, 420 and response 430 are presented in FIG. 7.

Figure 5:
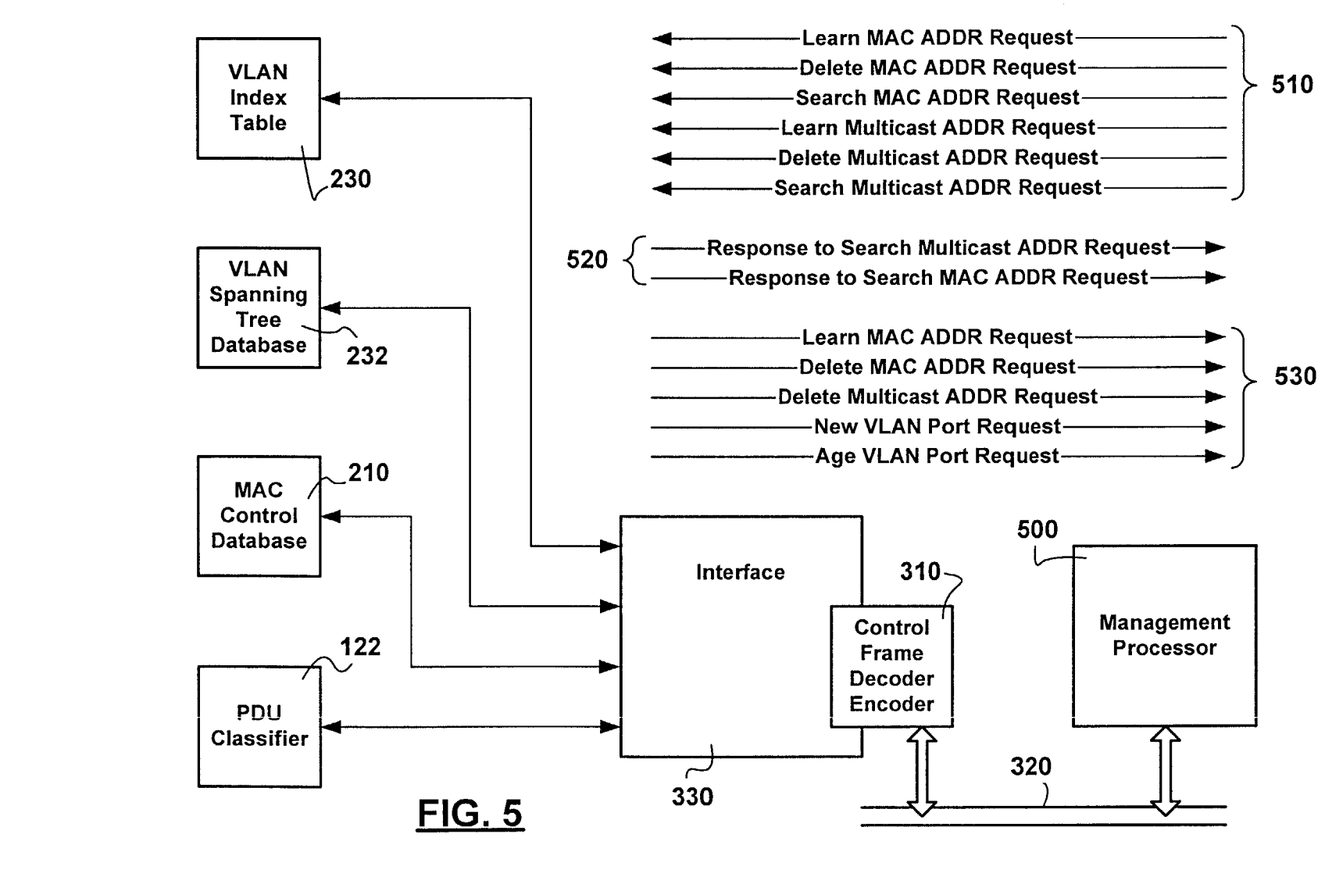
FIG. 5 is another schematic diagram showing exemplary internal components of a data switching node and, associated requests and responses implementing an information exchange protocol in accordance with an exemplary implementation of the invention.

FIG. 5 is another schematic diagram showing exemplary internal components of a data switching node and, associated requests and responses implementing an information exchange protocol in accordance with an exemplary implementation of the invention.

In support of the exemplary address resolution function 124 and the virtual networking function 150, the management processor 500, in maintaining the MAC control database 210 service delivery component and in optimizing the performance of the PDU classifier 122 service delivery component, issues data frame encapsulated requests 510 such as: a learn MAC address request, a delete MAC address request, a search MAC address request, a learn multicast address request, delete multicast address request, search multicast address request, etc.

In response to the search MAC address request and the search multicast address request, the management processor 500 receives data frames encapsulating responses 520: a response to a search MAC address request and a response to a search multicast address request.

The above mentioned service delivery components in performing their respective functionality issue requests 530 for the management processor including: a learn MAC address request, a delete MAC address request, a delete multicast address request, a new VLAN port request (announcement), an age VLAN port request (announcement), etc. (Aging features are typically used in minimizing memory storage requirements at the data switching node by deleting stale information not used for a relatively long period of time.)

Figure 8:
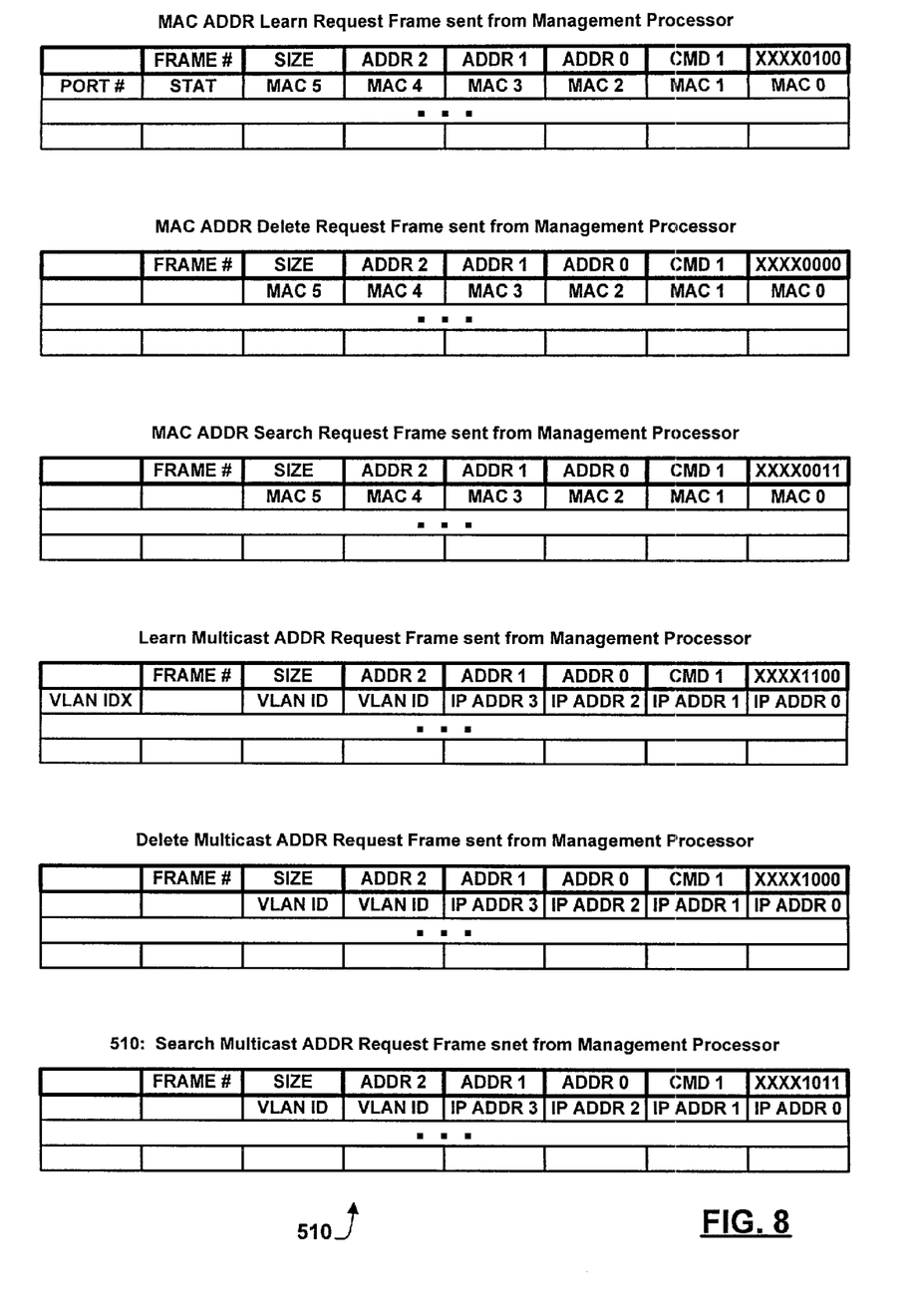
Figure 9:
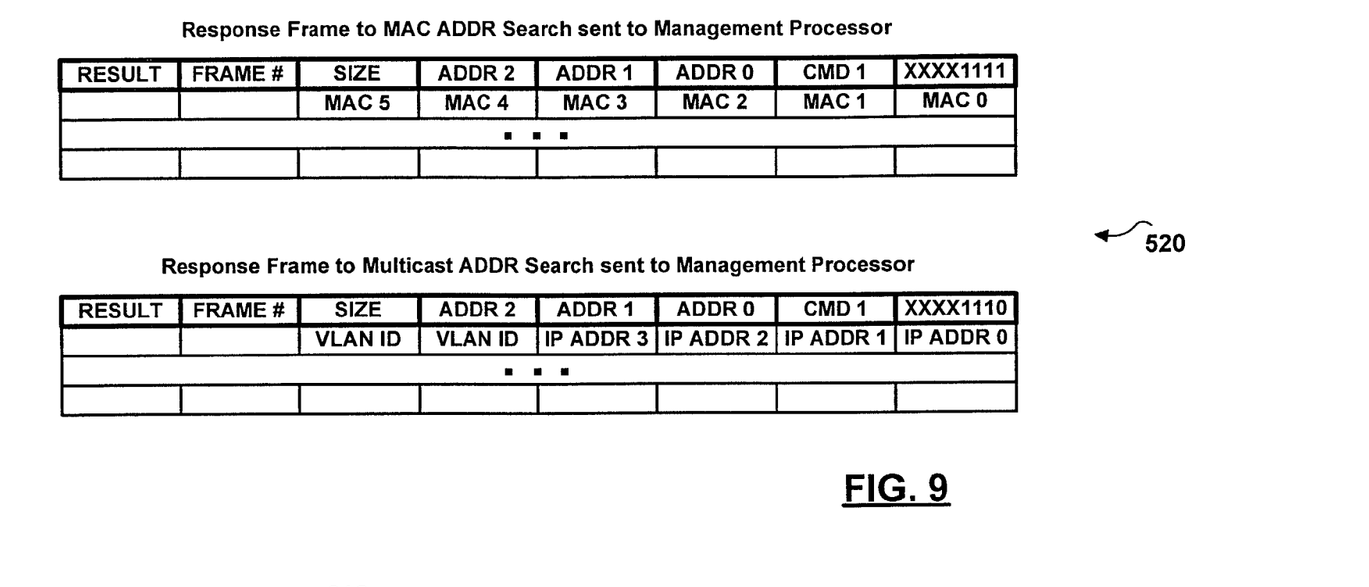
Figure 10:
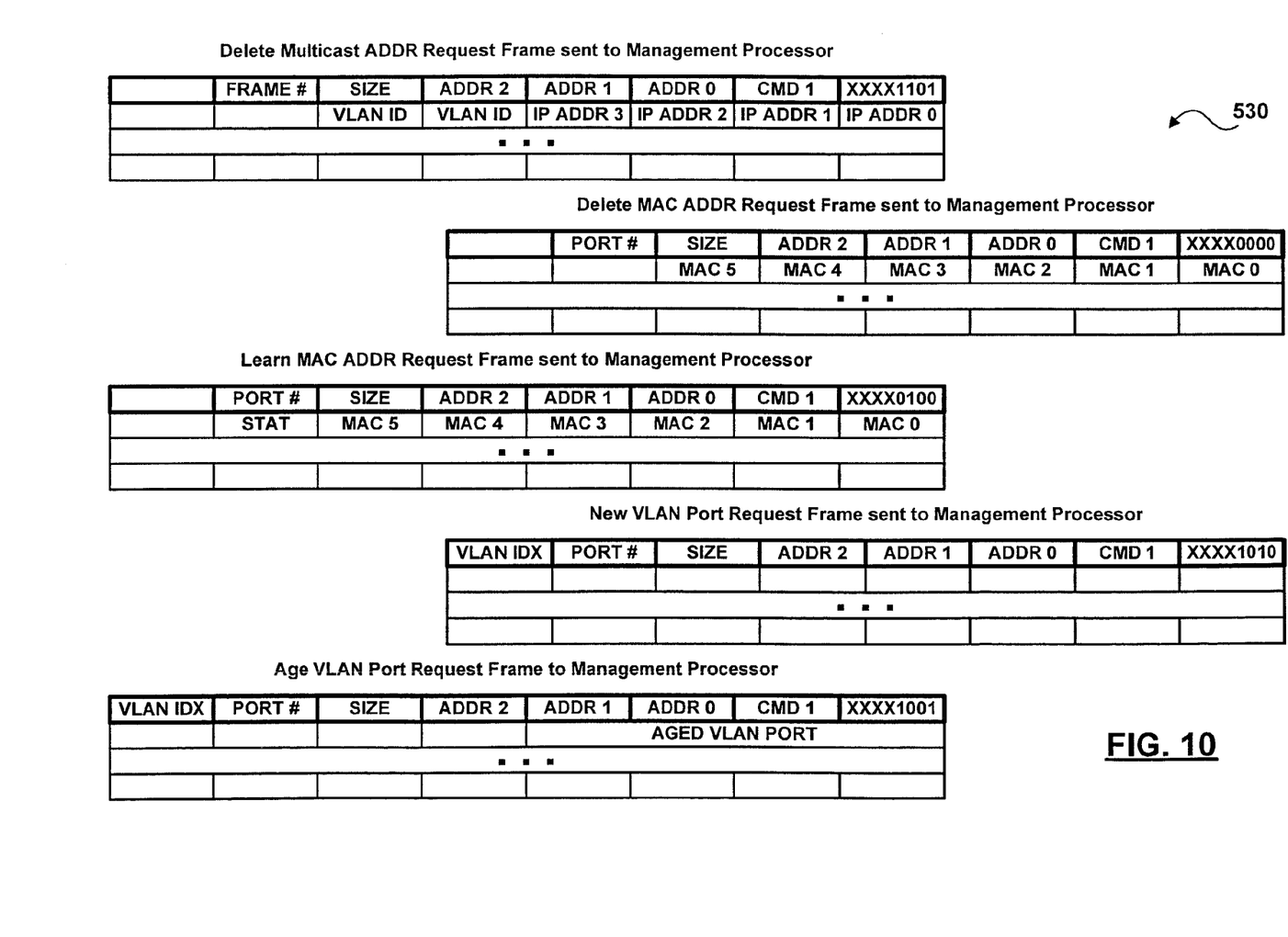

The data frame formats corresponding to requests 510, 530 and response 520 are presented in FIG. 8, FIG. 9 and FIG. 10.

Figure 6:
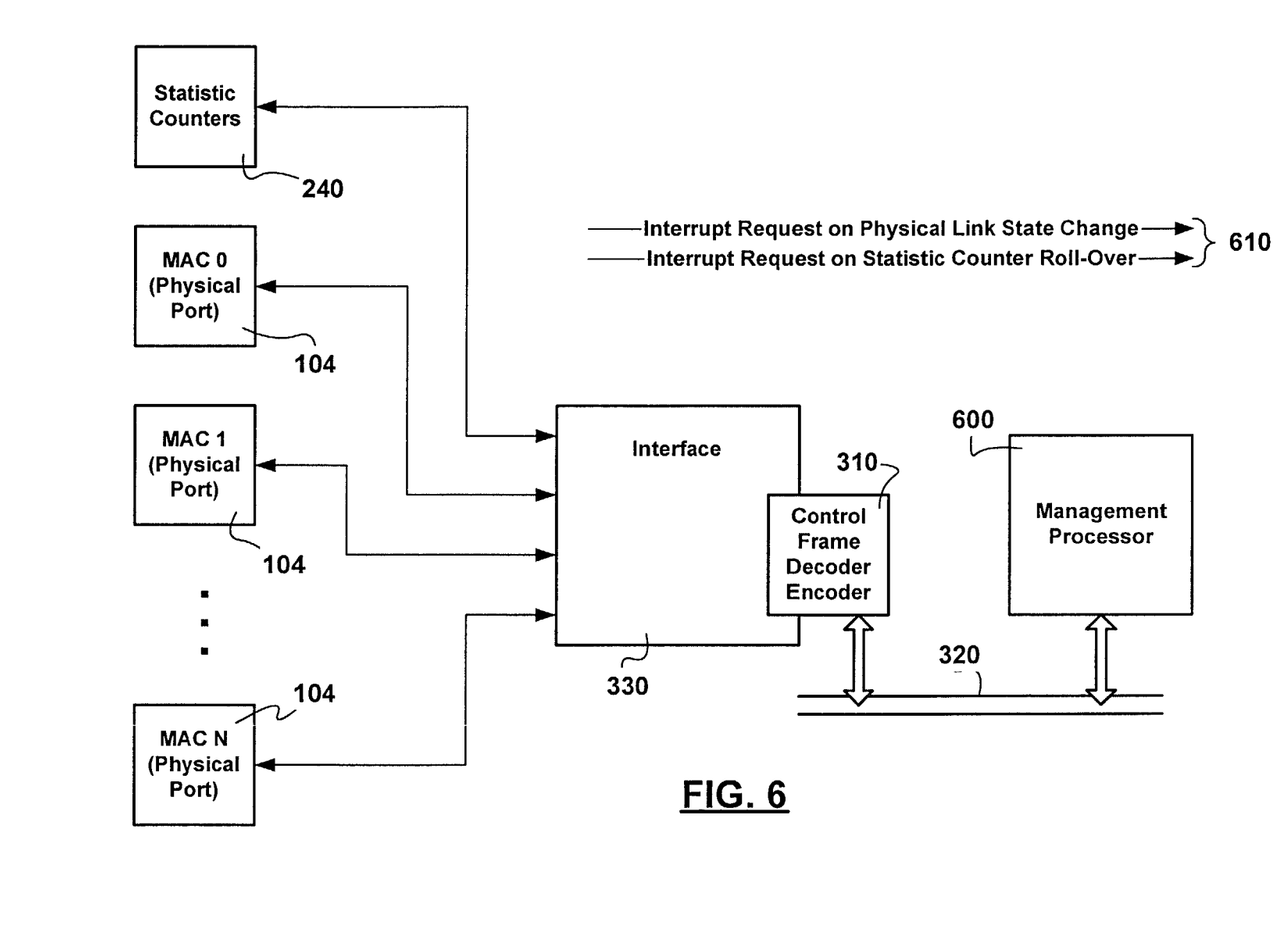
FIG. 6 is yet another schematic diagram showing exemplary internal components of a data switching node and, associated interrupt requests implementing an information exchange protocol in accordance with an exemplary implementation of the invention.

FIG. 6 is yet another schematic diagram showing exemplary internal components of a data switching node and, associated interrupt requests implementing an information exchange protocol in accordance with an exemplary implementation of the invention.

In support of the port monitoring function 140 and the statistics gathering function 132, the management processor 600 is informed of detected critical events via encapsulated interrupt requests 610. An interrupt request on physical link state change is issued by physical ports 104 to inform the management processor 600 whether the link is functional. An interrupt request on statistic counter roll-over is sent to the management processor 600 if the value of a cumulative statistic counter exceeds a maximum expressible value of a register holding the value of the cumulative statistic counter. (Concurrent with the issuance of the statistic counter roll-over interrupt request the value of the register associated with the statistic counter is reset to a predetermined value—typically 0.)

Figure 11:
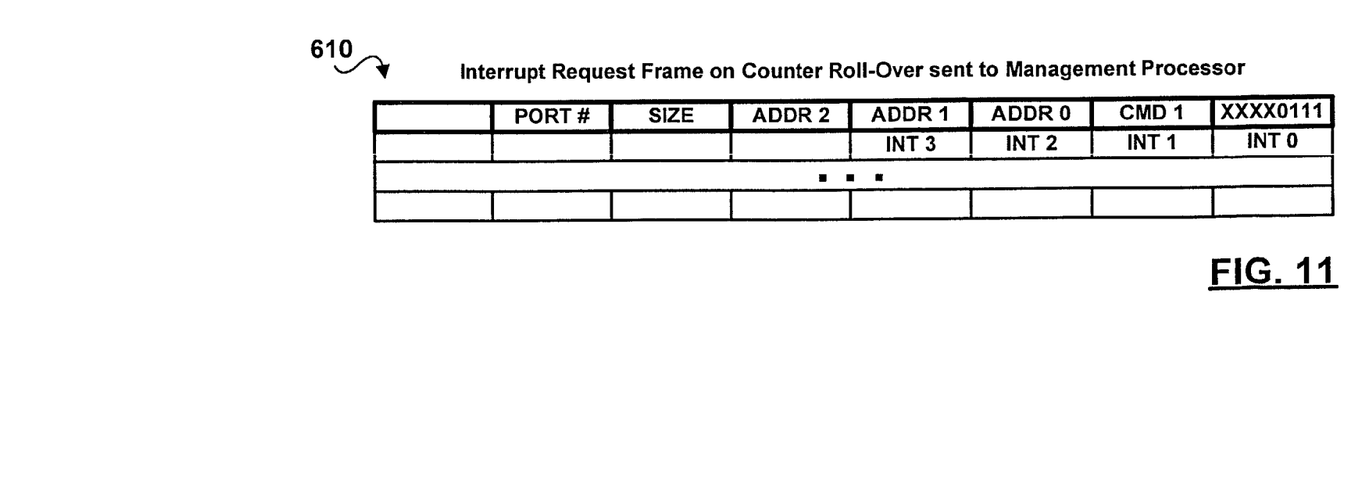

The data frame format corresponding to interrupt requests 610 is presented in FIG. 11.

As mentioned above an 8 byte header is used in conveying data frames. The header includes data fields specifying: a data frame type identifier, a data frame sequence number, a memory address for read and writes, etc. The invention is not limited to the above data fields; other fields may be used in implementing different features and functionality. At least the data frame type identifier data field is mandatory. Data fields in the header have a specific location with respect to the start of the data frame. In the example shown the data frame type identifier is specified in the fist data field and specifically the first 4 bits of the first byte (top right corner). At a minimum, the data frame type identifiers have to be unique for data frames sent via the data exchange medium 320 in a single direction; that is, data frame type identifiers may be reused for data frame transfers in the opposite direction.

Data fields are also used in exchanging information. Various data fields are shown in the above presented diagrams each of which has a specific location with respect to the beginning of the data frame. In conveying information in accordance with the invention, less than the full payload of each data frame may be used. The data exchange medium 320 may make use of hardware handshaking data flow control specifying the beginning and the end transmission of relevant information held in each data frame. The use of hardware handshaking in conveying partial data frames optimizes the use of the bandwidth of the data exchange medium 320.

The embodiments presented are exemplary only and persons skilled in the art would appreciate that variations to the above described embodiments may be made without departing from the spirit of the invention. The scope of the invention is solely defined by the appended claims.

We claim:

1. A method of exchanging information internal to a data switching node between at least two internal components, the method comprising steps of:
   a. encapsulating a data stream of the information to be exchanged in a data frame at a first component and dividing the data stream into a stream of data granules, each data frame encapsulating a single data granule;
   b. associating a header having a data format with each data granule, the encapsulated data granule representing a payload of the corresponding data frame;
   c. conveying the data frame between the first component and a second component via a data exchange medium; and
   d. selectively decapsulating the exchanged information at the second component whereby the conveyance of encapsulated information provides a common information exchange format facilitating expansion, upgrade and new deployment of features and services in data switching environments.

2. A method as claimed in claim 1, wherein dividing the data stream into a stream of granules, the method further comprises a step of dividing the data stream into a stream of fixed size data granules.

3. A method as claimed in claim 1, wherein dividing the data stream into a stream of granules, the method further comprises a step of dividing the data stream into data granules of at most 32 bytes long.

4. A method as claimed in claim 1, wherein associating a header with each data granule, the method further comprises a step of associating a fixed size header therewith.

5. A method as claimed in claim 1, wherein associating a fixed size header with each encapsulated data granule, the method further comprises the step of associating an 8 bytes long header therewith.

6. A method as claimed in claim 1, wherein associating a header having a format with an encapsulated data granule, the method further comprises a step of associating a header having data fields.

7. A method as claimed in claim 6, wherein associating a header having data fields with the encapsulated data granule, the method further comprises a step of specifying a data frame type identifier unique to each data frame type, the data frame type identifier being specified in a specific data field.

8. A method as claimed in claim 6, wherein associating a header having data fields with the encapsulated data granule, the method further comprises a step of specifying a data frame sequence number, the data frame sequence number being specified in a data field.

9. A method as claimed in claim 6, wherein associating a header having data fields with the encapsulated data granule, the method further comprises a step of identifying in a data field the encapsulating data frame as one of: an interrupt data frame, a request data frame and a response data frame.

10. A method as claimed in claim 1, wherein conveying the data frame between the first component and the second component, the method further comprises a step of conveying an encapsulated request.

11. A method as claimed in claim 1, wherein conveying the data frame between the first component and the second component, the method further comprises a step of conveying an encapsulated response.

12. A method as claimed in claim 9, wherein the subsequent to conveying the encapsulated request, the method further comprises a step of conveying at least one encapsulated response generated by the request.

13. A method as claimed in claim 12, wherein the method further comprises a step of assigning a data frame sequence number to the data frame encapsulating the response, the data frame sequence number having the same value as a data frame sequence number of the data frame encapsulating the corresponding request.

14. A method as claimed in claim 1, wherein conveying the data frame between the first component and the second component, the method further comprises a step of conveying an encapsulated interrupt request.

15. A method as claimed in claim 14, wherein the subsequent to conveying the encapsulated interrupt request, the method further comprises a step of conveying at least one encapsulated request generated by the interrupt request.

16. A method as claimed in claim 15, wherein the method further comprises a step of assigning a data frame sequence number to the data frame encapsulating the request, the data frame sequence number having the same value as a data frame sequence number of the data frame encapsulating the interrupt request.

17. A method as claimed in claim 14, wherein the subsequent to conveying the encapsulated interrupt request, the method further comprises a step of conveying at least one encapsulated response generated by the interrupt request.

18. A method as claimed in claim 17, wherein the method further comprises a step of assigning a data frame sequence number to the data frame encapsulating the response, the data frame sequence number having the same value as a data frame sequence number of the data frame encapsulating the interrupt request.

19. A method as claimed in claim 6, wherein associating a header having data fields with the encapsulated data granule, the method further comprises a step of identifying in a data field data field memory addressing used in conveying data to a specified memory address.

20. A method as claimed in claim 6, wherein associating a header having data fields with the encapsulated data granule, the method further comprises a step of identifying in a data field data field memory addressing used in conveying data from a specified memory address.

21. A method as claimed in claim 1, wherein encapsulating the exchanged information, the method further comprises a step of encapsulating the exchanged information in a payload portion of the data frame, the payload portion of the data frame having a data format.

22. A method as claimed in claim 1, wherein encapsulating the exchanged information, the method further comprises a step of encapsulating the exchanged information in at least one data field of a payload portion of the data frame, the at least one data field having a fixed position within the data frame.

23. A method as claimed in claim 22, wherein conveying the data frame, the method further comprises a step of conveying empty fields as data padding.

24. A method as claimed in claim 1, wherein conveying the data frame, the method further comprises a step of signaling a beginning of the conveyance of the data frame.

25. A method as claimed in claim 1, wherein conveying the data frame, the method further comprises a step of signaling an end of the conveyance of the data frame.

26. A method as claimed in claim 24, wherein conveying the data frame, the method further comprises a step of signaling the end of the data frame as soon as all relevant exchanged information has been conveyed whereby variable length data frames are conveyed enabling an efficient use of the bandwidth of the data exchange medium.

27. A method as claimed in claim 1, wherein conveying the data frame, the method further comprising a step of dividing the data frame into data fragments for transmission over the data exchange medium.

28. A method as claimed in claim 26, wherein dividing the data frame into data fragments, the method further comprises a step of dividing the data frame into data fragments having a length of 8 bits for transmission via a data exchange medium comprising an 8 bit data bus.

29. A method as claimed in claim 27, wherein dividing the data frame into data fragments, the method further comprises a step of dividing the data frame into data fragments having a length of 16 bits for transmission via a data exchange medium comprising a 16 bit data bus.

30. A method as claimed in claim 27, wherein dividing the data frame into data fragments, the method further comprises a step of dividing the data frame into bits for transmission via a data exchange medium comprising an serial link.

* * * * *